US011102754B2

(12) United States Patent
Martin et al.

(10) Patent No.: US 11,102,754 B2
(45) Date of Patent: Aug. 24, 2021

(54) WIRELESS TELECOMMUNICATIONS APPARATUSES AND METHODS

(71) Applicant: Sony Corporation, Tokyo (JP)

(72) Inventors: Brian Alexander Martin, Basingstoke (GB); Yuxin Wei, Basingstoke (GB); Vivek Sharma, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 98 days.

(21) Appl. No.: 16/346,127

(22) PCT Filed: Oct. 9, 2017

(86) PCT No.: PCT/EP2017/075607
§ 371 (c)(1),
(2) Date: Apr. 30, 2019

(87) PCT Pub. No.: WO2018/082869
PCT Pub. Date: May 11, 2018

(65) Prior Publication Data
US 2019/0261309 A1   Aug. 22, 2019

(30) Foreign Application Priority Data
Nov. 3, 2016   (EP) ..................... 16197181

(51) Int. Cl.
*H04W 68/00* (2009.01)
*H04W 76/14* (2018.01)
(Continued)

(52) U.S. Cl.
CPC ........... *H04W 68/005* (2013.01); *H04W 8/08* (2013.01); *H04W 8/26* (2013.01); *H04W 24/08* (2013.01);
(Continued)

(58) Field of Classification Search
CPC . H04W 68/8005; H04W 76/14; H04W 76/11; H04W 76/27; H04W 8/08;
(Continued)

(56) References Cited

U.S. PATENT DOCUMENTS 8,855,034 B2 * 10/2014 Park ...................... H04L 5/001
370/311
2012/0044910 A1 * 2/2012 Maeda .................. H04L 5/001
370/332
(Continued)

FOREIGN PATENT DOCUMENTS

EP    1 244 321 A1    9/2002
EP    3160211 A1 *   4/2017 ............ H04W 88/04
(Continued)

OTHER PUBLICATIONS

Holma et al, "LTE for UMTS OFDMA and SC-FDMA Based Radio Access", Wiley 2009, System Architecture Based on 3GPP SAE, 11 pages.
(Continued)

*Primary Examiner* — Saumit Shah
(74) *Attorney, Agent, or Firm* — Xsensus LLP

(57) ABSTRACT

A method of paging a terminal, by a base station and via a relay node, wherein the terminal is configured to communicate with the base station via the relay node. The method comprises notifying the relay node of a paging identifier for identifying the terminal at least in paging messages; and the base station transmitting a paging message for the terminal. The paging message comprises the paging identifier; the paging message is transmitted at a paging time for a destination identifier; and the method further comprises the relay node monitoring the paging time for the destination identifier for paging messages comprising the paging identifier.

19 Claims, 5 Drawing Sheets

(51) Int. Cl.
| | |
|---|---|
| *H04W 76/11* | (2018.01) |
| *H04W 76/27* | (2018.01) |
| *H04W 8/08* | (2009.01) |
| *H04W 8/26* | (2009.01) |
| *H04W 24/08* | (2009.01) |
| *H04W 52/02* | (2009.01) |
| *H04W 84/04* | (2009.01) |
| *H04W 88/04* | (2009.01) |

(52) U.S. Cl.
CPC ........ *H04W 52/0229* (2013.01); *H04W 76/11* (2018.02); *H04W 76/14* (2018.02); *H04W 76/27* (2018.02); *H04W 84/047* (2013.01); *H04W 88/04* (2013.01)

(58) Field of Classification Search
CPC ... H04W 8/26; H04W 24/08; H04W 52/0229; H04W 84/047; H04W 88/04
See application file for complete search history.

(56) References Cited

U.S. PATENT DOCUMENTS

| | | | |
|---|---|---|---|
| 2012/0238208 | A1 | 9/2012 | Bienas et al. |
| 2016/0057738 | A1* | 2/2016 | Lee ................ H04W 72/042 370/329 |
| 2017/0142653 | A1* | 5/2017 | Qi ................... H04W 52/0212 |
| 2017/0273078 | A1* | 9/2017 | Rico Alvarino ...... H04W 68/00 |
| 2019/0045482 | A1* | 2/2019 | Lee .................. H04W 76/27 |
| 2019/0215800 | A1* | 7/2019 | Fujishiro ............. H04W 48/18 |

FOREIGN PATENT DOCUMENTS

| | | |
|---|---|---|
| WO | 2016/019528 A1 | 2/2016 |
| WO | 2018/010820 A1 | 1/2018 |

OTHER PUBLICATIONS

3GPP, "3rd Generation Partnership Project; Technical Specification Group Radio Access Network; Evolved Universal Terrestrial Radio Access (E-UTRA); User Equipment (UE) procedures in idle mode", Release 13, 3GPP TS 36.304 V13.3.0, Sep. 2016, pp. 1-46.

International Search Report and Written Opinion dated Dec. 22, 2017 for PCT/EP20171075607 filed on Oct. 9, 2017, 11 pages.

3GPP, "3rd Generation Partnership Project; Technical Specification Group Radio Access Network; Study on further enhancements to LTE Device to Device (D2D), User Equipment (UE) to network relays for Internet of Things (IoT) and wearables", Release 14, 3GPP TR 36.746 V0.3.0, R2-167324, Oct. 2016, pp. 1-11.

LG Electronics, "Motivation for New SI Enhancements of relayed Connection via WLAN and LTE Sidelink(ECO)", RP-160241, 7 pages.

China Telecom, "Discussion on UE Relay for eMBB and IoT", 3GPP TSG RAN Meeting No. 71, Document for: discussion, Agenda Item: 10.1.1, RP-160247, Göteborg, Sweden, Mar. 7-10, 2016, 7 pages.

Qualcomm, "Motivation for SI proposal on Further Enhancements to LTE Device to Device", Agenda: 10.1.2, RP-160268, pp. 1-10.

ZTE, "Motivation for new Work Item on D2D communication for commercial use cases", 3GPP TSG RAN Meeting No. 71, RP-160283, Goteborg, Sweden, Mar 7-10, 2016, 8 pages.

Huawei et al., "L2 UE-to-Network Relay for E-UTRAN", 3GPP TSG-RAN #71 RP-160415, Göteborg, Sweden, Mar. 7-10, 2016, pp. 1-4.

Intel, "Motivation for SI: Further LTE D2D Enhancements for Wearables and MTC", 3GPP TSG RAN Meeting No. 71 RP-160427, GOteborg, Sweden, Mar. 7-10, 2016, pp. 1-14.

Qualcomm Incorporated, "Revision of SI: Further Enhancements LTE Device to Device, UE to Network Relays for IoT and Wearables", 3GPP TSG RAN Meeting No. 72 RP-161303, Busan, Korea, Jun. 13-16, 2016, 7 pages.

* cited by examiner

WIRELESS TELECOMMUNICATIONS APPARATUSES AND METHODS

CROSS-REFERENCE TO RELATED APPLICATIONS

The present application is based on PCT filing PCT/EP2017/075607 filed Oct. 9, 2017, which claims priority to EP 16197181.7 filed Nov. 3, 2016, the entire contents of each are incorporated herein by reference.

BACKGROUND

Field

The present disclosure relates to wireless telecommunications apparatus and methods.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly.

Future wireless communications networks will be expected to efficiently support communications with a wider range of devices associated with a wider range of data traffic profiles and types than current systems are optimised to support. For example it is expected future wireless communications networks will be expected to efficiently support communications with devices including reduced complexity devices, machine type communication devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance, whereas other types of device, for example supporting high-definition video streaming, may be associated with transmissions of relatively large amounts of data with relatively low latency tolerance. A single device type might also be associated with different traffic profiles depending on the applications it is running. For example, different consideration may apply for efficiently supporting data exchange with a smartphone when it is running a video streaming application (high downlink data) as compared to when it is running an Internet browsing application (sporadic uplink and downlink data).

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles.

For a wireless telecommunications system to efficiently support terminal devices of different types having different capabilities and communicating different types of data, the network infrastructure needs to know the relevant characteristics of the terminal devices' operation—i.e. the characteristics which may impact how communications with the terminal device should be handled to improve efficiency. In this regard the relevant characteristics of a terminal device's operation may be broadly considered to fall into two categories of information.

A first category, which may be referred to herein as capability information, includes information which relates to the fundamental ability of the terminal device to access the radio network, for example in terms of the radio access technologies it supports, its operating bandwidth and frequencies, MIMO support, carrier aggregation support, and so on. Capability information may thus broadly be considered to relate to characteristics of the device which are generally set by hardware and which determine how the terminal device can access the physical layer. The use of such capability information in configuring communications in wireless telecommunications systems is well established.

A second category of information, which may be referred to herein as application information or device context information, includes information which relates to higher-layer operations of the terminal device (i.e. layers higher than the physical later), for example including information relating to software applications the device supports/is currently running, and the nature of the device and how it is being used, for example in terms of whether the device is a static device, a mobile device, a wearable device, and so on. Application information/device context information may thus be considered to include information representing parameters/characteristics that relate to a current mode of operation for a mobile device, its environment and mobility, and other information which is separate from the capability information relating to how the terminal device may physically access the radio interface.

In conventional wireless telecommunications networks, such as LTE-based networks, it is known for terminal to rely on a relay to communicate with a network, for example to reach a base station that is otherwise out of reach of the terminal. However, when a relay is configured to relay data to and/or from a base station, the base station is not aware of the presence of the terminal, only of that of the relay node such that it cannot contact the terminal. While this enables an efficient relaying in the network, it also creates communications channels that do not enable to use relaying in some use cases, for example in some ProSe use cases.

SUMMARY

The present disclosure can help address or mitigate at least some of the issues discussed above.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
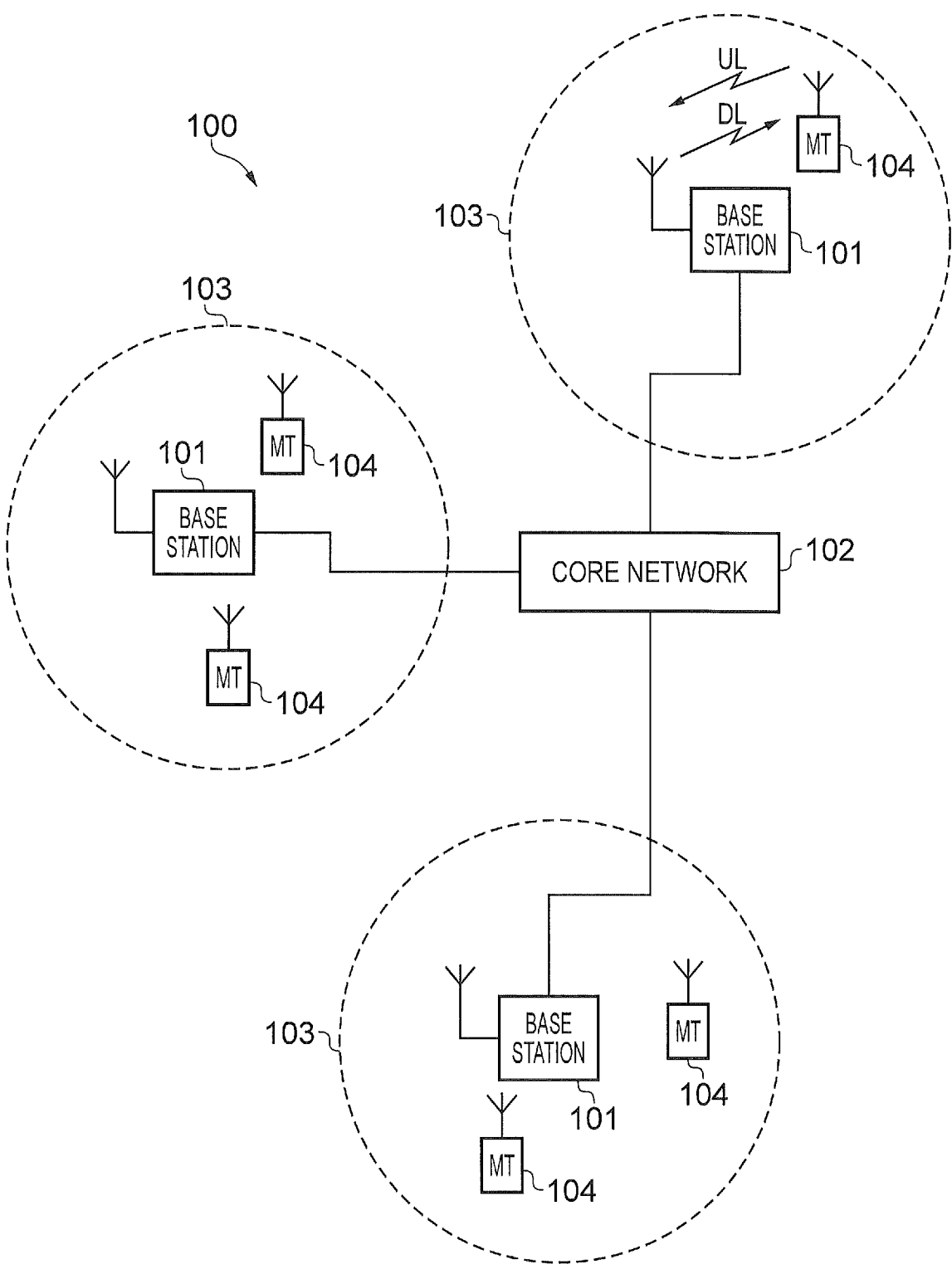
FIG. 1 schematically represents some aspects of a LTE-type wireless telecommunication network which may be configured to operate in accordance with certain embodiments of the present disclosure.

FIG. 1 provides a schematic diagram illustrating some basic functionality of a mobile telecommunications network/system 100 operating generally in accordance with LTE principles but which may also support other radio access technologies and which may implement embodiments of the disclosure as described herein. Various elements of FIG. 1 and their respective modes of operation are well-known and defined in the relevant standards administered by the 3GPP (RTM) body, and also described in many books on the subject, for example, Holma H. and Toskala A [1]. It will be appreciated that operational aspects of the telecommunications network which are not specifically described below may be implemented in accordance with any known techniques, for example according to the relevant standards and previously proposed modifications and additions to the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, communications device, and so forth. Base stations, which are an example of network infrastructure equipment, may also be referred to as transceiver stations/nodeBs/e-nodeBs, and so forth.

Figure 2:
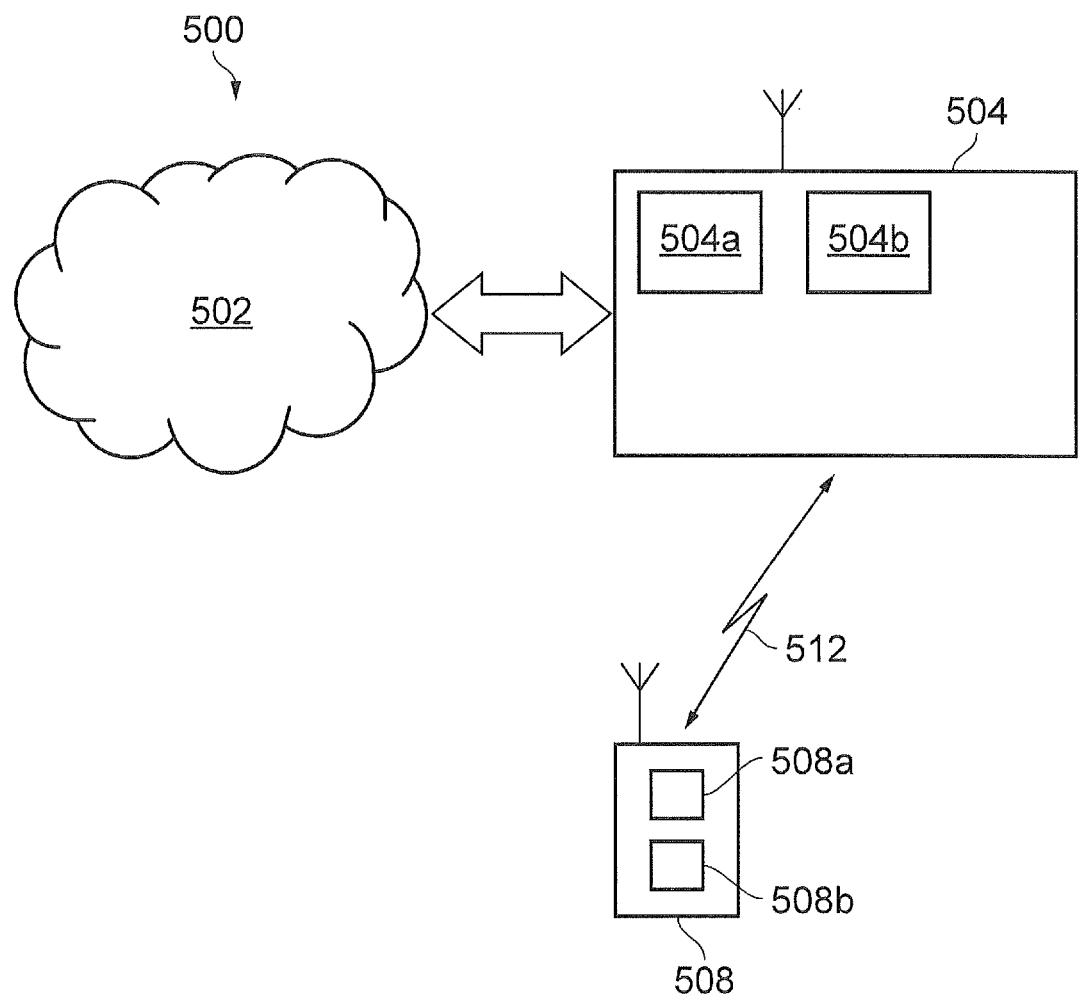
FIG. 2 schematically represents some aspects of a wireless telecommunications network configured to operate in accordance with certain embodiments of the present disclosure.

FIG. 2 schematically shows some further details of a telecommunications system 500 according to an embodiment of the present disclosure. The telecommunications system 500 in this example is based broadly around an LTE-type architecture and the telecommunications system may also support other radio access technologies, either using the same hardware as represented in FIG. 2 with appropriately configured functionality or separate hardware configured to operate in association with the hardware represented in FIG. 2. Many aspects of the operation of the telecommunications system/network 500 are known and understood and are not described here in detail in the interest of brevity. Operational aspects of the telecommunications system 500 which are not specifically described herein may be implemented in accordance with any known techniques, for example according to the current LTE-standards and other proposals for operating wireless telecommunications systems.

The telecommunications system 500 comprises a core network part (evolved packet core) 502 coupled to a radio network part. The radio network part comprises a base station (evolved-nodeB) 504 coupled to a terminal device 508. In this example, only one base station 504 and one terminal device 508 are represented in FIG. 2. However, it will of course be appreciated that in practice the radio network part will typically comprise a plurality of base stations serving a larger number of terminal devices across various communication cells, as well as potentially including transceiver stations supporting radio communications with terminal devices on cells operating in accordance with other radio access technologies, such as UTRAN, GERAN, WLAN or a 5G new RAT. However, only a single base station and terminal device are shown in FIG. 2 in the interests of simplicity.

The terminal device 508 is arranged to communicate data to and from the base station (transceiver station) 504. The base station is in turn communicatively connected to a serving gateway, S-GW, (not shown) in the core network part which is arranged to perform routing and management of mobile communications services to the terminal device in the telecommunications system 500 via the base station 504. In order to maintain mobility management and connectivity, the core network part 502 also includes a mobility management entity, MME, (not shown) which manages the enhanced packet service, EPS, connections with the terminal device 508 operating in the communications system based on subscriber information stored in a home subscriber server, HSS. Other network components in the core network (also not shown for simplicity) include a policy charging and resource function, PCRF, and a packet data network gateway, PDN-GW, which provides a connection from the core network part 502 to an external packet data network, for example the Internet. As noted above, the operation of the various elements of the communications system 500 shown in FIG. 2 may be conventional apart from where modified to provide functionality in accordance with embodiments of the present disclosure as discussed herein. It will be appreciated embodiments of the invention may in general be implemented in wireless communications systems operating in accordance with different radio access technologies, for example, who one or more of UTRAN, GERAN, WLAN or a 5G new RAT (NR) networks, and these other radio access technologies will not necessarily incorporate the same network infrastructure components as for an LTE implementation (e.g. there may be no serving gateway in new RAT networks).

The terminal device 508 is adapted to support operations in accordance with embodiments of the present disclosure when communicating with the base station 504 as discussed further herein. The terminal device 508 comprises transceiver circuitry 508a (which may also be referred to as a transceiver/transceiver unit) for transmission and reception of wireless signals and processor circuitry 508b (which may also be referred to as a processor/processor unit) configured to control the terminal device 508. The processor circuitry 508b may comprise various sub-units/sub-circuits for providing functionality in accordance with embodiments of the present disclosure as described herein. These sub-units may be implemented as discrete hardware elements or as appropriately configured functions of the processor circuitry. Thus the processor circuitry 508b may comprise circuitry which is suitably configured/programmed to provide the desired functionality described herein using conventional programming/configuration techniques for equipment in wireless telecommunications systems. The transceiver circuitry 508a and the processor circuitry 508a are schematically shown in FIG. 2 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated the terminal device 508 will in general comprise various other elements associated with its operating functionality, for example a power source, user interface, and so forth, but these are not shown in FIG. 2 in the interests of simplicity.

The base station 504 comprises transceiver circuitry 504a (which may also be referred to as a transceiver/transceiver unit) for transmission and reception of wireless signals and processor circuitry 504b (which may also be referred to as a processor/processor unit) configured to control the base station 504 to operate in accordance with embodiments of the present disclosure as described herein. The processor circuitry 504b may again comprise various sub-units, such as a scheduling unit, for providing functionality in accordance with embodiments of the present disclosure as explained further below. These sub-units may be implemented as discrete hardware elements or as appropriately configured functions of the processor circuitry. Thus, the processor circuitry 504b may comprise circuitry which is suitably configured/programmed to provide the desired functionality described herein using conventional programming/configuration techniques for equipment in wireless telecommunications systems. The transceiver circuitry 504a and the processor circuitry 504b are schematically shown in FIG. 2 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated the base station 504 will in general comprise various other elements associated with its operating functionality, such as a scheduler. For example, although not shown in FIG. 2 for simplicity, the processor circuitry 504b may comprise scheduling circuitry, that is to say the processor circuitry 504b may be configured/programmed to provide the scheduling function for the base station 504.

Figure 3:
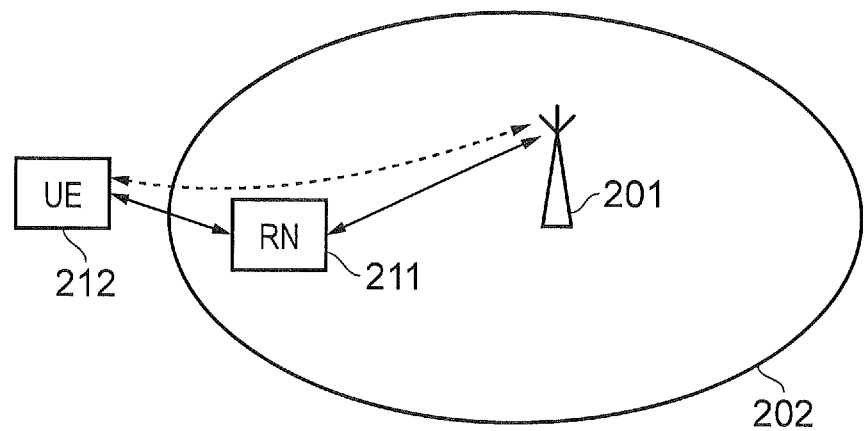
FIG. 3 schematically represents some aspects of a wireless telecommunications network comprising a relay node.

FIG. 3 schematically represents some aspects of a wireless telecommunications network comprising a relay node. In this example, the base station 201 can communicate directly with the relay ide ("RN") 211 but not with the terminal ("UE") 212 that is out of reach of the base station as it sits outside the cell 202 provided by the base station 201. If RN 211 is configured to relay communications between the terminal 212 and the base station 211, then the terminal 212 can communicate with the base station 201, as illustrated with the dotted line in FIG. 3. While FIG. 3 illustrates the general principle of relaying, implementing such an arrangement in a mobile network can be challenging due to for example the security requirements, the existing procedures already in place (which may not for example facilitate the setup of a relaying configuration). It is noteworthy that the example of FIG. 3 is for illustrative purposes only and that other relaying configurations are possible and considered under the present disclosure, such as for example a case where the terminal 212 is within the cell 202 but still uses the relay 211 for communicating with or via the base station 201. This is particularly relevant to cases where the terminal 212 is on the edge of the cell 202.

As a result, the current arrangement for relaying is one where the base station is not aware of the presence of the terminal but, as far as it is concerned it is only communicating with the relay. The relay can then determine to whom the data should actually be sent, whether it will be itself or to another element, for example to a terminal for which it is acting as a relay. As a result, in the event that the base station is intending to exchange data with the terminal, it will in fact exchange the data with the relay node and the relay node will then be able to exchange the data with the terminal.

Figure 4:
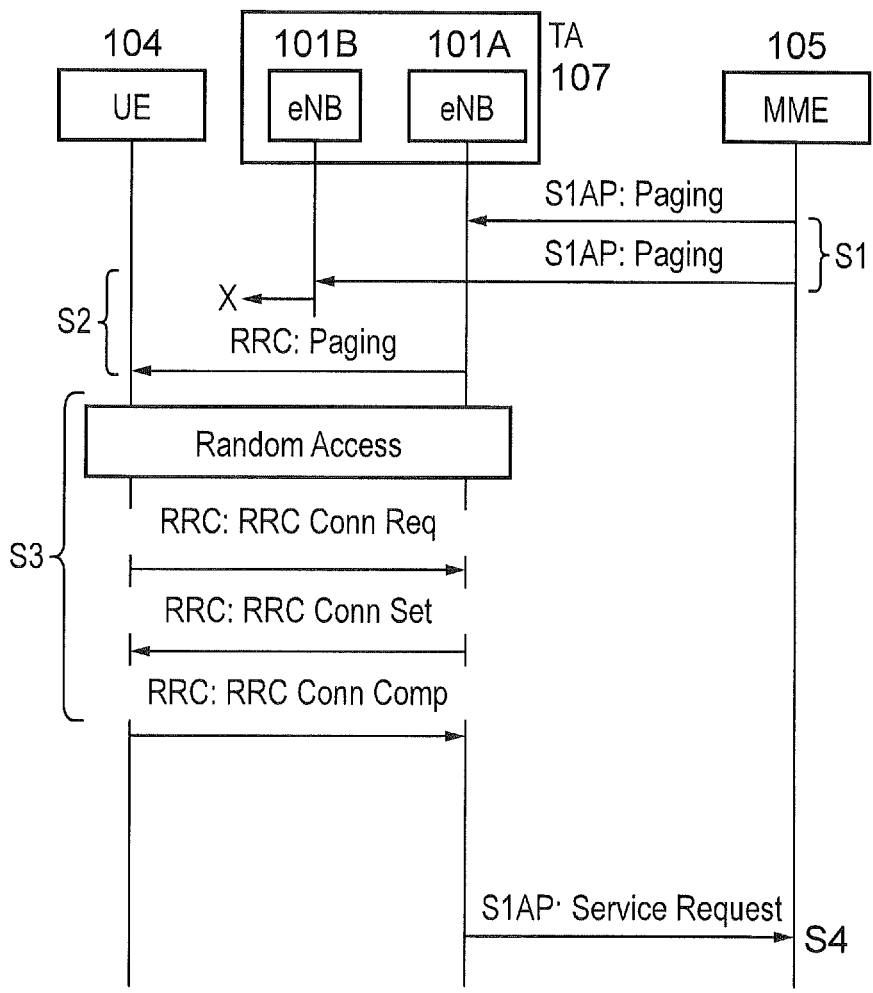
FIG. 4 schematically represents a signaling ladder diagram representing a conventional paging procedure.

FIG. 4 schematically represents a signalling ladder diagram representing a conventional paging procedure and is a signalling ladder diagram representing a conventional paging procedure for a terminal device 104 operating within the example LTE-type network schematically represented in FIG. 1. FIG. 4 schematically represents signalling and operating functions associated with the terminal device 104, the base stations 101A, 101B comprising the tracking area 107, and the core network, in particular the MME 105. Although not represented, for ease of reference the respective cells of base stations 101A and 101B will hereinafter be referred to as cell 103A and cell 103B for brevity.

For the sake of this example it is assumed the UE 104 has attached to the network through base station 101A within the tracking area 107. As is well known, the specific base station through which the terminal device initially attaches may be determined from reference signal measurements, and so forth, whereby the terminal device determines which base station is most appropriate. After the procedure for attachment, the core network assigns an IP address for the UE. From this point onwards the core network will recognise the existence of the terminal device and keep track of its location at a tracking area level as discussed above. Thus, in this particular example, the core network identifies the terminal device as being within tracking area 107 (because the terminal device has accessed the network through base station 101A, which is within tracking area 107). In this example, it is assumed the UE 104 has not moved to a different tracking area and so has not provided any tracking area update. Hence the core network 102 continues to assume that the terminal device is located somewhere within tracking area 107.

Having attached to the network, the UE 104 enters RRC idle mode. In the conventional paging procedure in LTE, an idle device periodically checks for paging messages broadcast on a paging channel, with a frequency set by the cycle of the Discontinuous Receive (DRX) mode so that a check happens each time the device wakes up for its DRX active time. This is known as a paging occasion, and in it the UE decodes resource allocation information in a Physical Downlink Control Channel (PDCCH) and finds the paging message in an associated Physical Downlink Shared Channel (PDSCH).

Considering FIG. 4, the MME 105 recognises that a paging instance has arisen for the UE 104 which is in idle mode. The specific reason for the paging requirement is not significant, and may, for example be because a third party is seeking to place a telephone call to the UE 104. The MME thus initiates a paging procedure to contact the UE 104.

As has been discussed above, the MME 105 in the core network 102 can recognise that the UE 104 is located in one of the communication cells 103A and 103B which comprise tracking area 107, but the MME 105 does not know which one. Accordingly, in step S1, the MME 105 sends a paging request message over the S1-AP interface to each of the base stations 101A and 101B associated with the tracking area 107. Thus, in this example the MME 105 sends paging request messages to both base stations 101A and 101B. The MME 105 does not send a paging request message to the base station 101C serving communication cell 103C because communication cell 103C is not within tracking area 107 in which the terminal device is taken as being located.

All base stations receiving a paging request message from the MME 105, in this case base stations 101A and 101B, are configured to then transmit paging signalling to seek to establish contact with the required terminal device 104. This is schematically represented in FIG. 4 in step S2. The paging signalling is an RRC: Paging message format, since this communication stage is between the eNB and the UE.

It is assumed for this example that the idle UE 104 has remained within the coverage area 103A of base station 101A, and will be checking for paging messages. It therefore receives the paging signalling transmitted in step S2 by base station 101A, as a paging occasion. The paging signalling sent in step S2 by base station 101B is of course not received by the UE 104, and so this is in effect wasted signalling.

After receipt of the paging signalling by the UE 104 in step S2, the UE 104 needs to establish a RRC_CONNECTED state with the eNB, so the Random Access procedure (conventional under LTE) is performed, shown in step S3 of FIG. 4. Conventionally, Random Access, being an RRC connection establishment procedure initiated by a UE, comprises a RRC Connection Request message from the UE to the eNB, a RRC Connection Set-up message from the eNB back to the UE, and a RRC Connection Complete message from the UE to the eNB. The UE 104 has now transitioned in an RRC_CONNECTED state.

Finally, in step S4, the eNB 101A uses the S1 interface to send a Service Request message to the MME 105. This informs the MME that the UE has been successfully contacted and is able to receive data.

In accordance with the present invention there is provided an arrangement where the network (e.g. the base station) can contact a specific terminal, even when the terminal is communicating with the network via a relay node. For example, the terminal is assigned an identifier for the relay to be able to monitor paging massages for the terminal. The identifier can be included in the paging messages for the terminal and, in some cases, can be used to determine a paging occasion associated with the terminal, namely, the timing of the paging message transmission is derived from the identifier (in other cases an identifier for the relay may for example be used to derive the paging occasion).

In some examples, the identifier for the terminal is the terminal's UE identity (e.g. IMSI or TMSI) or based on the terminal's UE identity (e.g. IMSI mod 1024) while in other cases it can be, or be based on, a "resume" ID associated with a suspended RRC connection, as will be clear from the discussion below. In some examples, the identifier for the terminal, as included in the paging message to identify the recipient of the paging message, is the IMSI or TMSI and the paging occasion is derived from either the IMSI/TMSI (as appropriate), or from an identifier for the relay node in the event that the paging is carried out on the relay paging times. The identifier for the relay node may also be an IMSI or TMSI for the relay in some examples.

Figure 5:
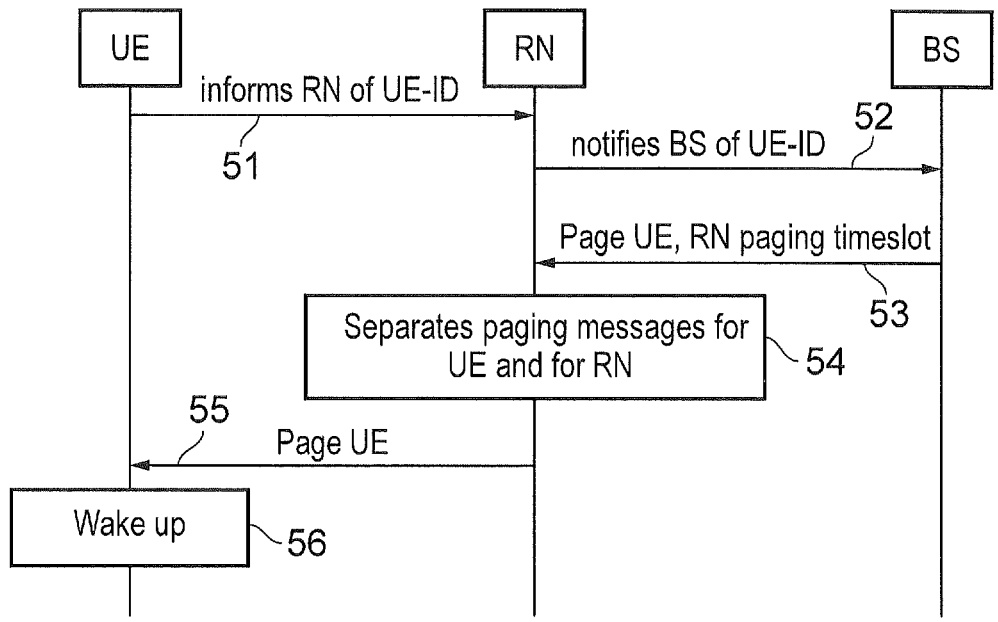
FIG. 5 schematically represents some aspects of a paging method in a wireless telecommunications network comprising a relay node.

FIG. 5 schematically represents some aspects of a paging method in a wireless telecommunications network comprising a relay node in accordance with a first example of the present disclosure. In this example, the network is able to page the terminal using the terminal identifier ("UE ID") and using the relay paging occasion (that is the paging occasion calculated based on the relay UE identity). In other words, the base station pages the terminal using a paging occasion that is not for the terminal. The paging message can be received by and forwarded by the relay and/or received directly by the remote UE in the event that it is within coverage of the base station and that it monitors the paging occasions for the relay. For example the terminal may be notified of the relay UE paging occasions, it can monitor for paging using the relay UE paging occasion. In this example, the terminal can be notified of the paging occasions for the relay for example by being notified of an identifier for the relay and where the terminal can then derive the paging occasions from the relay identifier. This example can assist the terminal in receiving the paging messages ultimately addressed to itself in case of mobility for example, where it may no longer be connected to the from relay and thus unable to receiving the paging message via the relay.

Now returning to FIG. 5, this figure illustrates an example procedure as follows. At 51, the terminal establishes a connection with the relay. This is likely to occur while the relay is RRC connected to the network or to trigger an RRC connection between the relay and network (for example such that the network can authorize and/or be notified of the relaying). The terminal can provide its identifier "UE-ID" (e.g. IMSI) or, alternatively, a temporary ID may be allocated (e.g. RNTI, resume ID or likewise). Once the connection with the relay is established and optionally, the relay can provide information to the remote UE about the paging occasions the relay is monitoring.

Then at 52 the relay can inform and/or negotiate the terminal's connection with the network. At the end of this step, the base station is aware of the presence of the terminal associated with UE-ID, of its identifier UE-ID and of the identity of its relay.

If the network wishes to page the terminal, it can then send a paging message to the terminal, the message being addressed to the UE-ID and, in this first example, being scheduled to correspond to the paging occasions for the relay for the terminal (see 53). In other words, the base station is then using the relay device paging occasions for paging the remote UE. Accordingly, the relay device can go or remain in an idle mode to save power while still monitoring its own paging occasions. The relay can check for its own identifier and also for the UE-ID for any remote UEs it is acting for as a relay (54). In one example the relay can maintain a paging record of UE-ID of any remote UEs it is serving, so the paging messages can be forwarded to the relevant terminal.

In one example, the paging record list comprises identifiers that may be used in a paging message and can for example contain a list of IMSI or TMSI for identifying the remote UE, that is, the ultimate terminal for which the paging message is intended. As will be clear from the discussion below, other types of identifiers for addressing the remote UEs via a relay may be used, for example in the event that it would be preferable for the relay not to be aware of the IMSI or TMSI for the remote UE.

In the event that the paging message is intended for the terminal, the relay can then page the terminal, e.g. by relaying the paging message with the UE-ID (55). For sending this second message, the relay can use the appropriate timing/scheduling. For example it may be sent on paging occasions for the relay to page the terminal. Once the terminal has been paged, it can wake up (55) to set up the necessary connections to connect directly or indirectly (via the relay) with the base station that has paged it via the relay.

Also, in this example, even if the terminal no longer needs to use the relay is now able to communicate directly with the base station (e.g. if it has moved and is now closer to the base station or further from the relay), it can disconnect from the relay and camp on the cell provided by the base station. The terminal can then monitor the relay device paging occasions, for checking paging addressed to its own identifier. This can be done until for example until the terminal connects directly to the base station (the base station can then revert to normal paging) or connects to a different base station. With this type of paging monitoring by the terminal, the terminal will be informed of the ID for the relay; part of the ID for the relay and/or of an indication what paging occasions to use so that it can monitor the relevant paging occasions. Preferably the terminal will be notified of this relay paging occasions information prior to a disconnection from the relay (e.g. it can be informed as soon as it is connected to the relay).

Figure 7:
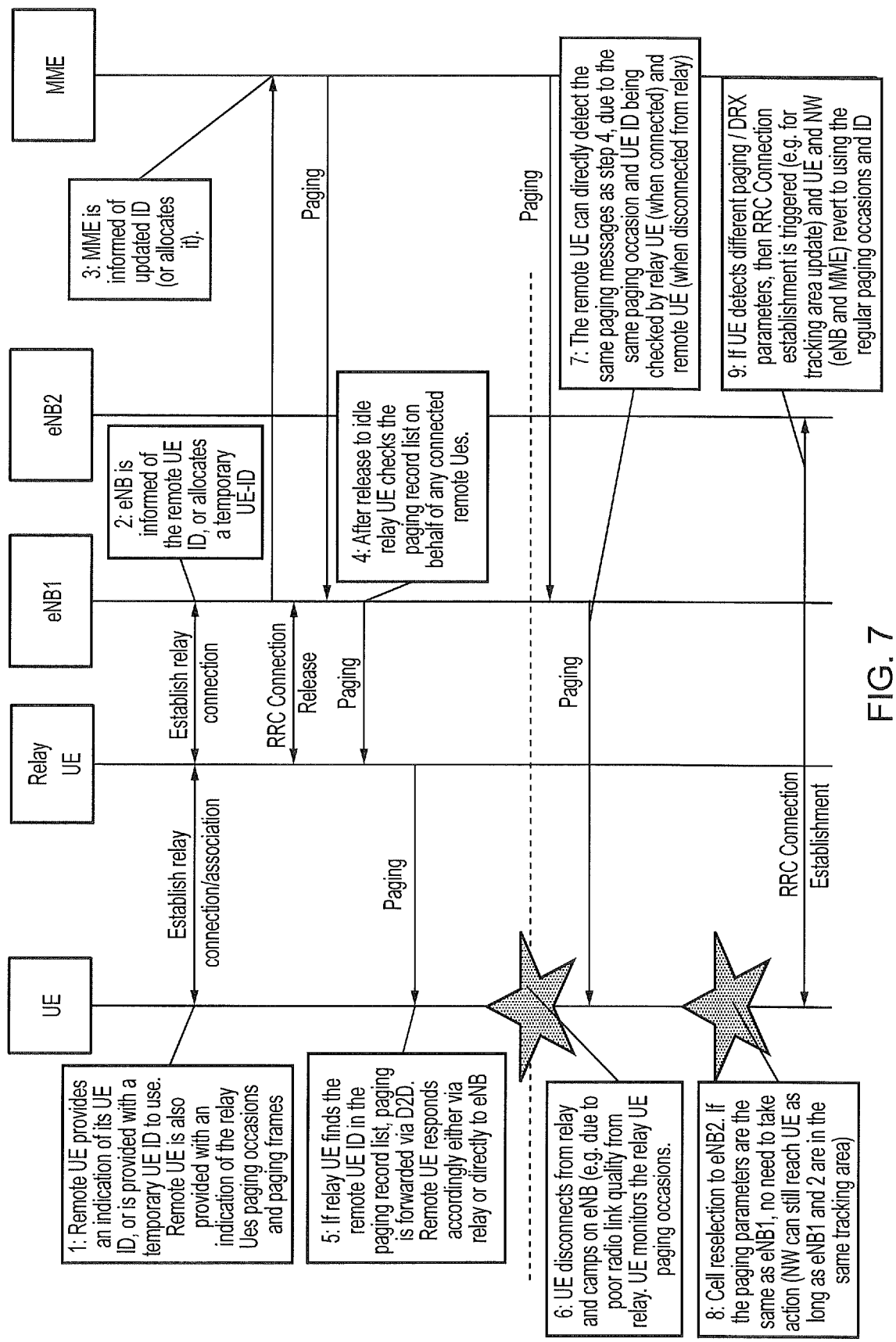
FIG. 7 schematically represents some aspects of a paging method in a wireless telecommunications network comprising a relay node.

FIG. 7 schematically represents some aspects of a paging method in a wireless telecommunications network comprising a relay node. The illustration of FIG. 7 provides a more detailed example implementation of the method discussed in respect of FIG. 5 above where the method comprises the following steps:

1: the remote UE provides an indication of its UE ID, or is provided with a temporary UE ID to use. The remote UE is also provided with an indication of the relay UEs paging occasions and paging frames 2: the eNB is informed of the remote UE ID, or allocates a temporary UE-ID—as appropriate.

3: the MME is informed of the updated ID (or allocates it—as appropriate).

4: After release to idle, the relay checks the paging record list on behalf of any connected remote UEs for any received paging message.

5: If the relay finds the remote UE ID in the paging record list, the paging message and/or information is forwarded, for example using a D2D technique. The remote UE responds accordingly either via relay or directly to the eNB.

6: the UE disconnects from relay and camps on the cell for the eNB (e.g. due to poor radio link quality from relay and/or to mobility). The remote UE monitors the relay UE paging occasions.

7: The remote UE can directly detect the same paging messages as step 4, as it is aware of the paging occasion used (same as for step 4, namely paging occasion for relay) and the UE ID can be detected by relay UE (when connected) and/or the remote UE (when disconnected from relay)

8: Cell reselection to eNB2. If the paging parameters are the same as eNB1, no need to take action (the network can still reach UE as long as eNB1 and eNB2 are in the same tracking area)

9: If the UE detects different paging/DRX parameters, then a RRC Connection establishment is triggered (e.g. for tracking area update) and the UE and network (eNB and MME) communicate with each other as appropriate. For example they can revert to using the regular paging occasions and ID or the terminal may also use a relay which can assist with relaying the paging for the terminal.

This option limits the power consumption for the relay node, in particular in cases where the relay serves several remote terminals. In effect, the relay only monitors its own paging occasions and does not have to "wake up" at different occasions to monitor paging messages. However this example requires changes in how the network/base stations page the terminals as the paging messages would have to be transmitted to the terminal (using an identifier for the terminal) but at a paging occasion that correspond to a different identifier/mobile node, namely the relay.

In a second example, the paging information is sent on paging occasions that correspond to the remote UE. This case is similar to that discussed above, for example in respect of FIGS. 5 and 7, but where the base station sends the paging message at a scheduled time that is for the ultimate destination (e.g. at a time derived from the UE-ID) but wherein the paging message will effectively be monitored, received and forwarded by the relay. The relay UE can thus monitor paging occasions of the remote UE(s) as well as its own paging occasions.

Figure 6:
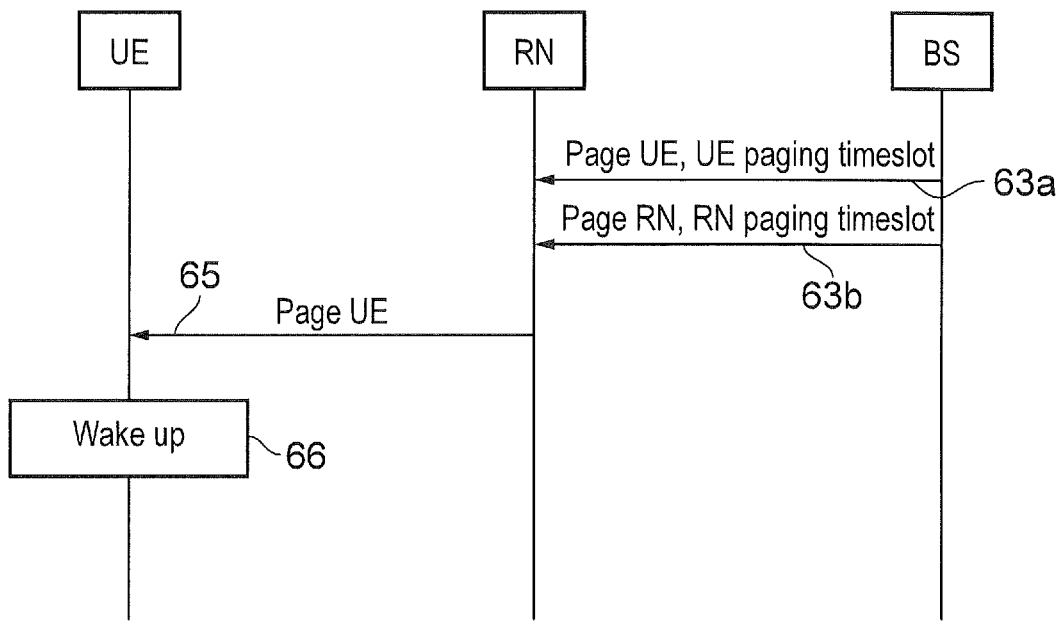
FIG. 6 schematically represents some aspects of a paging method a wireless telecommunications network comprising a relay node.

This example is illustrated in FIG. 6 which schematically represents some aspects of a paging method a wireless telecommunications network comprising a relay node. The initial steps are similar to those previously discussed in respect of the first example such that, in the interest of conciseness, they will not be repeated again. Then, at 63, the base station can send a paging message. If the paging message is for the terminal, it is sent with the UE-ID and at a paging occasion for the terminal (63a) while, of the paging message is for the relay, it is sent with an identifier for the relay and at a paging occasion for the relay (63b). The relay monitors both paging occasions so that it can receive all paging messages and if it detects one for the terminal, it can forward the paging information to the terminal (65) so that the terminal can wake up from an idle mode and set up a connection with the base station (via the relay if appropriate).

In this second example, the relay is expected to monitor several paging occasions and will thus use more power—and even more so if the relay is serving a large number of terminals. However, on the other hand, this other example requires minimal modifications to the network elements such as the base station that can page a terminal being relayed in a conventional way (despite the terminal not communicating with the base station directly).

As the skilled person will be aware, the paging occasions will be calculated using the appropriate method for deriving a paging timing from at least an identifier. This is discussed in particular in 36.304 "Evolved Universal Terrestrial Radio Access (E-UTRA); User Equipment (UE) procedures in idle mode" [2], in sections 7.1 and 7.3.

As the skilled person will appreciate, with the first example where the paging is on occasions for the relay node, the remote UE can adjust its paging occasions to be aligned with those of the relay UE. The terminal can do so as soon as it is aware of the paging occasions for the relay or only when it expect that it will be able to reliable receive paging messages from the base station and/or to no longer be serviced by the relay. For example, the terminal can monitor the relay paging occasions so that it can disconnect from the relay and camp on the cell of the base station, in a conventional manner, without having to inform the network that it is no longer relying on the relay but only on the base station directly, to communicate with the network.

On the other hand, in the second example, where the relay monitors the paging occasions for the remote UE, the terminal UE-ID (or at least the IMSI or the IMSI modulo 1024 so that the paging occasion can be derived) may be shared with the remote UE so that the relay can monitor the paging occasions corresponding to the terminal's identifier. In case this is not possible or not desired (e.g. due to security, not sharing the device ID) then the relay UE or base station might generate a temporary UE-ID to provide to the remote UE. This temporary ID could be used both in the paging record list, as well as for calculation of paging occasion. In some cases, the temporary identifier is selected such that its corresponding paging occasions are identical to those of the terminal. For example, if the UE-ID mod 1024 is used to determine the paging occasion, the temporary ID may be selected such that it has the same mod 1024 value and additionally comprise other random or otherwise values to make a full identifier in accordance with the appropriate standard or expectations of the network or terminal. Otherwise, some of the parameters which come from paging occasion calculation could be provided to the remote UE, for example SFN mod T and i_s (see [2]) such that an appropriate temporary can be selected such that the true identifier for the terminal does not have to be communicated but such that the paging occasions would not be altered. This example could be used as long as the UE is on the same cell as the relay, or if the terminal reselects another cell using the same DRX length and parameters. In case the UE reselects to another cell and detects the DRX parameters are different to those used for relay paging occasion calculation, the UE may have to perform a connection establishment to inform the network of its location, and revert to using its own paging occasions as well as the regular UE-ID in the paging record list (if another one was being used). Alternatively it can set up a new temporary identifier that is adapted for the terminal and the new cell.

Overall, with this second example, the relay UE can monitor the paging occasions associated with the remote UE, where the UE-ID (e.g. IMSI mod 1024, or temporary ID) of the remote UE is provided to the relay. This communications can thus be handled locally between the remote UE and the relay without necessarily updating for example the base station and MME. As a result, this example may be less disruptive to the existing network elements and require minimal changes. However, when multiple remote UEs are connected via the relay, this example implies an increased power consumption for the relay, especially in case the paging occasions are all different.

In some examples, rather than having the relay checking a paging record list to determine if the ID in the paging message is one of the specific remote UE IDs in the list and forwarding only the relevant paging messages, the relay can be configured to always forward some or all of paging messages to some or all of the remote UEs, or to forward the paging messages containing the recognizable part of the UE ID (e.g. IMSI mod 1024). Although this would simplify the checking process for the relay, this would also likely increase power consumption for both the relay and the remote UE. If for example the relay forwards all paging messages to all remote UEs, each remote UE will likely receive paging messages that are not addressed to itself and will then receive more paging messages than it requires. The remote UE will then have to check all the messages and thus increase its power consumption compared to a case where only the relevant paging messages—or more relevant paging message—are forwarded to the remote UE.

In yet further examples, rather than using any of the IDs discussed above, the ID for the terminal can be an ID that is already shared between the terminal and base station and that is associated with a suspended connection between the base station and terminal. The skilled person is for example directed to PCT application PCT/EP2016/066958 filed 15 Jul. 2016, the content of which is incorporated herein by reference in its entirety. Accordingly, a common ID may be used for alignment of paging occasions by sharing, with the relay, the "resume ID" used when performing the connection suspend/resume procedure. Connection suspend/resume was introduced for CiOT optimisation in Release 13 of 3GPP wherein, rather than releasing the RRC Connection, the UE can be sent to an idle mode and can store AS related context information (e.g. security related parameters). According to this arrangement, instead of a UE ID, the resume ID can be sent to the network in a resume request such that the context can be automatically retrieved by the network to re-establish the connection with the terminal. Likewise, in release 14, "light connection" is being discussed wherein a resume ID may be used in the paging message and which can thus be used by the RAN to perform paging to a device. One advantage of this further approach is that the context information will be known to the base and the remote UE, and the shared/resume ID does not allow the relay to interpret any of the forwarded data (because the security context exists between the remote UE and network and the relay does not have access to it) and it can prevent sharing of the IMSI.

Therefore, in accordance with the present disclosure, a remote terminal may not need to notify the network (e.g. the base station or via the base station) when it drops its connection to the relay device and reselects a cell to camp on it in a conventional manner, as it may be able to continue monitoring paging occasions for the relay device. Accordingly, signalling overhead savings can thereby be achieved. And the network can still reach the UE directly using normal paging (with different paging occasion and potentially different form of UE-ID)

Thus there has been described a method of paging a terminal, by a base station and via a relay node, wherein the terminal is configured to communicate with the base station via the relay node, the method comprising the base station transmitting a paging message for the terminal wherein: the paging message comprises a paging identifier for identifying the terminal; and the paging message is transmitted at a paging time for a destination identifier. Accordingly the terminal can be paged in a relay environment with a method that assist with reducing overhead and that can enable the base station to address the terminal directly. The "paging" identifier used for identifying the terminal is any suitable identifier for the terminal that can be used in the paging message. In some examples the paging identifier will be (or be based on) either an existing identifier for the terminal (e.g. the IMSI, the TMSI, a IMSI- or TMSI-based identifier), a temporary identifier (e.g. the RNTI or resume-ID for a terminal having a suspended RRC connection), or any other suitable identifier that will enable the base station and terminal to identify and address the terminal specifically. The paging time may be any appropriate time for paging the terminal. In current systems, this is typically a messaging occasion/time/schedule that is derived from one or more identifiers such that the paged terminal/device will be aware of when paging messages will be transmitted, if any.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely illustrative embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

In the present disclosure, method steps discussed herein may be carried out in any suitable order and not necessarily in the order in which they are listed. For example, steps may be carried out in an order which differs from an order used in the examples discussed above or from an indicative order used anywhere else for listing steps (e.g. in the claims), whenever possible or appropriate. Thus, in some cases, some steps may be carried out in a different order, or simultaneously (entirely or in part) or in the same order. So long as an order for carrying any of the steps of any method discussed herein is technically feasible, it is explicitly encompassed within the present disclosure.

As used herein, transmitting information or a message to an element may involve sending one or more messages to the element and may involve sending part of the information separately from the rest of the information. The number of "messages" involved may also vary depending on the layer or granularity considered. For example transmitting a message may involve using several resource elements in an LTE environment such that several signals at a lower layer correspond to a single message at a higher layer. Also, transmissions from one terminal to another may relate to the transmission of any one or more of user data, discovery information, control signalling and any other type of information to be transmitted.

Also, whenever an aspect is disclosed in respect of an apparatus or system, the teachings are also disclosed for the corresponding method. Likewise, whenever an aspect is disclosed in respect of a method, the teachings are also disclosed for any suitable corresponding apparatus or system. Additionally, it is also hereby explicitly disclosed that for any teachings relating to a method or a system where it has not been clearly specified which element or elements are configured to carry out a function or a step, any suitable element or elements that can carry out the function can be configured to carry out this function or step. For example any one or more of a mobile terminal, a base station or any other mobile unit may be configured accordingly if appropriate, so long as it is technically feasible and not explicitly excluded.

Whenever the expressions "greater than" or "smaller than" or equivalent are used herein, it is intended that they discloses both alternatives "and equal to" and "and not equal to" unless one alternative is expressly excluded or is not technically relevant.

It is noteworthy that even though the present disclosure has been discussed in the context of LTE and/or 5G, its teachings are applicable to but not limited to LTE, 5G or to other 3GPP standards. In particular, even though the terminology used herein is generally the same or similar to that of the 5G standards, the teachings are not limited to the present version of 5G and could apply equally to any appropriate arrangement not based on 5G and/or compliant with any other future version of an 5G or 3GPP or other standard.

Respective features of the present disclosure are defined by the following numbered examples:

Example 1. A method of paging a terminal, by a base station and via a relay node, wherein the terminal is configured to communicate with the base station via the relay node, the method comprising:
notifying the relay node of a paging identifier for identifying the terminal at least in paging messages; and
the base station transmitting a paging message for the terminal;
wherein:
the paging message comprises the paging identifier; and
the paging message is transmitted at a paging time for a destination identifier; and
the method further comprises the relay node monitoring the paging time for the destination identifier for paging messages comprising the paging identifier.

Example 2. The method of any preceding Example wherein the destination identifier is one of the paging identifier and an identifier for the relay node.

Example 3. The method of any preceding Example further comprising:
allocating a terminal identifier for the terminal; and
using the terminal identifier as one or both of the destination identifier and paging identifier.

Example 4. The method of Example 3 wherein allocating a terminal identifier comprises the terminal or base station determining an identifier and notifying the relay node of the terminal identifier for the terminal.

Example 5. The method of any preceding Example wherein the paging identifier is one of:
a permanent identifier for the terminal;
a temporary identifier that differs from a permanent identifier for the terminal and that is associated with the same paging time as the permanent identifier; and
a previously allocated identifier associated with a suspended connection with the base station for resuming a radio resource control connection.

Example 6. The method of any preceding Example further comprising:
the terminal monitoring the paging time for a relay identifier of the relay node for paging messages comprising the paging identifier.

Example 7. The method of any preceding Example further comprising:
the relay node monitoring the paging time for the destination identifier for paging messages for the terminal; and
the relay node monitoring the paging time for a relay identifier of the relay node for paging messages for the relay node.

Example 8. The method of any preceding Example further comprising:
the relay node receiving the transmitted paging message; and
the relay node relaying the paging message to the terminal.
Example 9. A base station for paging a terminal via a relay node wherein the terminal is configured to communicate with the base station via the relay node, the base station being configured to:
notify the relay node of a paging identifier for identifying the terminal at least in paging messages; and transmit a paging message for the terminal,
wherein:
the paging message comprises the paging identifier; and
the paging message is transmitted at a paging time for a destination identifier.
Example 10. The base station of Example 9, wherein the destination identifier is one of the paging identifier and an identifier for the relay node.
Example 11. The base station of any of Examples 9 to 10 being further configured to:
allocate a terminal identifier for the terminal; and
use the terminal identifier as one or both of the destination identifier and paging identifier.
Example 12. The base station of Example 11, wherein the base station is further configured to notify the relay node of the terminal identifier for the terminal.
Example 13. The base station of any of Examples 9 to 12, wherein the destination identifier is one of:
a permanent identifier for the terminal;
a temporary identifier that differs from a permanent identifier for the terminal and that is associated with the same paging time as the permanent identifier; and
a previously allocated identifier associated with a security context for resuming a radio resource control connection.
Example 14. Circuitry for a base station for paging a terminal via a relay node wherein the terminal is configured to communicate with the base station via the relay node, wherein the circuitry comprises a controller element and a transceiver element configured to operate together to:
notify the relay node of a paging identifier for identifying the terminal at least in paging messages; and transmit a paging message for the terminal,
wherein:
the paging message comprises the paging identifier; and
the paging message is transmitted at a paging time for a destination identifier.
Example 15. A base station configured to carry out the method of any of Examples 1 to 5.
Example 16. A method of assisting with the paging of a terminal, by a base station and via the relay node, wherein the terminal is configured to communicate with the base station via the relay node, the method comprising the relay node:
receiving a notification of a paging identifier for identifying the terminal at least in paging messages monitoring the paging time for a destination identifier for paging messages for the terminal, the terminal being identified by the paging identifier in the paging messages for the terminal; and
monitoring the paging time for a relay identifier of the relay node for paging messages for the relay node.
Example 17. The method of Example 16 wherein the destination identifier is one of the paging identifier and the relay identifier.
Example 18. The method of Example 16 or 17 further comprising receiving a notification of the destination identifier for the terminal.

Example 19. The method of any of Examples 16 to 18 further comprising:
receiving a paging message transmitted at the paging time for the destination identifier and comprising the paging identifier; and
relaying the received paging message to the terminal.
Example 20. The method of any of Examples 16 to 19 wherein the relay node is one of: a mobile terminal or a dedicated relay unit.
Example 21. A relay node for assisting with the paging of a terminal, by a base station and via the relay node, wherein the terminal is configured to communicate with the base station via the relay node, the relay node being configured to receive a notification of a paging identifier for identifying the terminal at least in paging messages; monitor the paging time for a destination identifier for paging messages for the terminal, the terminal being identified by the paging identifier in the paging messages for the terminal; and
monitor the paging time for a relay identifier of the relay node for paging messages for the relay node.
Example 22. The relay node of Example 21 wherein the destination identifier is one of the paging identifier and the relay identifier.
Example 23. The relay node of Example 21 or 22 being further configured to: receive a paging message transmitted at the paging time for the destination identifier and comprising the paging identifier; and
relay the received paging message to the terminal.
Example 24. The relay node of any of Examples 21 to 23 wherein the relay node is one of: a mobile terminal or a dedicated relay unit.
Example 25. Circuitry for a relay node for assisting with the paging of a terminal, by a base station and via the relay node, wherein the terminal is configured to communicate with the base station via the relay node, wherein the circuitry comprises a controller element and a transceiver element configured to operate together to:
monitor the paging time for a destination identifier for paging messages for the terminal, the terminal being identified by a paging identifier in the paging message; and
monitor the paging time for a relay identifier of the relay node for paging messages for the relay node.
Example 26. A relay node configured to carry out the method of any of Examples 16 to 20.
Example 27. A method of receiving paging messages by a terminal and from a base station, the method comprising:
the terminal monitoring the paging time for a relay identifier of a relay node for paging messages comprising a paging identifier, wherein the paging identifier is for identifying the terminal at least in paging messages.
Example 28. The method of Example 27 wherein the relay node is a relay that was previously relaying communications between the terminal and the base station.
Example 29. A terminal for receiving paging messages from a base station, the terminal being configured to:
monitor the paging time for a relay identifier of a relay node for paging messages comprising a paging identifier, wherein the paging identifier is for identifying the terminal at least in paging messages.
Example 30. Circuitry for a terminal for receiving paging messages from a base station, wherein the circuitry comprises a controller element and a transceiver element configured to operate together to monitor the paging time for a relay identifier of a relay node for paging messages comprising a paging identifier, wherein the paging identifier is for identifying the terminal at least in paging messages.

REFERENCES

[1] Holma H. and Toskala A, "LTE for UMTS OFDMA and SC-FDMA based radio access", John Wiley and Sons, 2009
[2] 3GPP 36.304 "Evolved Universal Terrestrial Radio Access (E-UTRA); User Equipment (UE) procedures in idle mode" 13.3.0, 3 Oct. 2016.

The invention claimed is:

1. A method of paging a terminal, by a base station and via a relay node, wherein the terminal is configured to communicate with the base station via the relay node, the method comprising:
   notifying the relay node of a paging identifier for identifying the terminal at least in paging messages; and
   the base station transmitting a paging message for the terminal;
   wherein:
   the paging message comprises the paging identifier, wherein the paging identifier is a temporary identifier that differs from a permanent identifier for the terminal and is associated with the same paging time as the permanent identifier; and
   the paging message is transmitted at a paging time for a destination identifier; and
   the method further comprises the relay node monitoring the paging time for the destination identifier for paging messages comprising the paging identifier.

2. The method of claim 1 wherein the destination identifier is one of the paging identifier and an identifier for the relay node.

3. The method of claim 1 further comprising:
   allocating a terminal identifier for the terminal, and
   using the terminal identifier as one or both of the destination identifier and paging identifier.

4. The method of claim 3 wherein allocating a terminal identifier comprises the terminal or base station determining an identifier and notifying the relay node of the terminal identifier for the terminal.

5. The method of claim 1 further comprising:
   the terminal monitoring the paging time for a relay identifier of the relay node for paging messages comprising the paging identifier.

6. The method of claim 1 further comprising:
   the relay node monitoring the paging time for the destination identifier for paging messages for the terminal; and
   the relay node monitoring the paging time for a relay identifier of the relay node for paging messages for the relay node.

7. The method of claim 1 further comprising:
   the relay node receiving the transmitted paging message; and
   the relay node relaying the paging message to the terminal.

8. A base station for paging a terminal via a relay node wherein the terminal is configured to communicate with the base station via the relay node, the base station including circuitry configured to:
   notify the relay node of a paging identifier for identifying the terminal at least in paging messages; and
   transmit a paging message for the terminal,
   wherein:
   the paging message comprises the paging identifier, wherein the paging identifier is a temporary identifier that differs from a permanent identifier for the terminal and is associated with the same paging time as the permanent identifier; and
   the paging message is transmitted at a paging time for a destination identifier.

9. The base station of claim 8, wherein the destination identifier is one of the paging identifier and an identifier for the relay node.

10. The base station of claim 8 being further configured to:
    allocate a terminal identifier for the terminal; and
    use the terminal identifier as one or both of the destination identifier and paging identifier.

11. The base station of claim 10, wherein the base station is further configured to notify the relay node of the terminal identifier for the terminal.

12. A method of assisting with paging of a terminal, by a base station and via a relay node, wherein the terminal is configured to communicate with the base station via the relay node, the method comprising the relay node:
    receiving a notification of a paging identifier for identifying the terminal at least in paging messages:
    monitoring paging time for a destination identifier for paging messages for the terminal, the terminal being identified by the paging identifier in the paging messages for the terminal, wherein the paging identifier is a temporary identifier that differs from a permanent identifier for the terminal and is associated with the same paging time as the permanent identifier; and
    monitoring the paging time for a relay identifier of the relay node for paging messages for the relay node.

13. The method of claim 12 wherein the destination identifier is one of the paging identifier and the relay identifier.

14. The method of claim 12 further comprising receiving a notification of the destination identifier for the terminal.

15. The method of claim 12 further comprising:
    receiving a paging message transmitted at the paging time for the destination identifier and comprising the paging identifier; and
    relaying the received paging message to the terminal.

16. The method of claim 12 wherein the relay node is one of: a mobile terminal or a dedicated relay unit.

17. A relay node for assisting with paging of a terminal, by a base station and via the relay node, wherein the terminal is configured to communicate with the base station via the relay node, the relay node including circuitry configured to:
    receive a notification of a paging identifier for identifying the terminal at least in paging messages;
    monitor paging time for a destination identifier for paging messages for the terminal, the terminal being identified by the paging identifier in the paging messages for the terminal, wherein the paging identifier is a temporary identifier that differs from a permanent identifier for the terminal and is associated with the same paging time as the permanent identifier; and
    monitor the paging time for a relay identifier of the relay node for paging messages for the relay node.

18. The relay node of claim 17 wherein the destination identifier is one of the paging identifier and the relay identifier.

19. The relay node of claim 17 being further configured to:

receive a paging message transmitted at the paging time for the destination identifier and comprising the paging identifier; and relay the received paging message to the terminal.

* * * * *